(12) United States Patent
Saarikko et al.

(10) Patent No.: US 7,901,466 B2
(45) Date of Patent: Mar. 8, 2011

(54) METHOD FOR PREPARING A SUSPENSION CONTAINING PHOSPHATE

(75) Inventors: Eija Saarikko, Espoo (FI); Juhani Poukari, Masala (FI); Paula Ylinen, Helsinki (FI); Anders Weckman, Espoo (FI)

(73) Assignee: Yara Suomi Oy, Helsinki (FI)

( * ) Notice: Subject to any disclaimer, the term of this patent is extended or adjusted under 35 U.S.C. 154(b) by 532 days.

(21) Appl. No.: 11/579,947

(22) PCT Filed: May 19, 2005

(86) PCT No.: PCT/FI2005/000232
§ 371 (c)(1),
(2), (4) Date: Mar. 14, 2007

(87) PCT Pub. No.: WO2005/113470
PCT Pub. Date: Dec. 1, 2005

(65) Prior Publication Data
US 2008/0022740 A1    Jan. 31, 2008

(30) Foreign Application Priority Data
May 21, 2004 (FI) .................................. 20040702

(51) Int. Cl.
*B01D 9/00* (2006.01)
(52) U.S. Cl. ........................................ 23/295 R; 23/296
(58) Field of Classification Search ............. 23/295 R, 23/296
See application file for complete search history.

(56) References Cited

U.S. PATENT DOCUMENTS

| 3,183,073 | A | 5/1965 | Preston |
| 3,676,100 | A | 7/1972 | Gerhardt et al. |
| 4,069,034 | A | 1/1978 | Hoover |
| 5,174,805 | A | 12/1992 | Masuda et al. |
| 5,482,529 | A | 1/1996 | Ahlnas et al. |
| 5,851,260 | A | 12/1998 | Aeijaelae et al. |
| 5,997,602 | A | 12/1999 | Aeijaelae et al. |
| 2003/0022790 | A1 | 1/2003 | Hero et al. |
| 2004/0152596 | A1 | 8/2004 | Peltonen et al. |

FOREIGN PATENT DOCUMENTS

| DE | 24 06 714 A1 | 8/1975 |
| EP | 0755369 | 1/1997 |
| EP | 0833806 | 4/1998 |
| JP | 6-345579 A | 12/1994 |
| JP | 8-91976 A | 4/1996 |
| WO | WO-95/28369 A1 | 10/1995 |
| WO | WO-97/00840 A1 | 1/1997 |
| WO | WO-01/45489 A1 | 6/2001 |
| WO | WO-03/000030 A1 | 1/2003 |
| WO | WO-2004/047516 A1 | 6/2004 |

*Primary Examiner* — Edward M Johnson
(74) *Attorney, Agent, or Firm* — Birch Stewart Kolasch & Birch, LLP

(57) ABSTRACT

The invention relates to a method for preparing a suspension containing phosphate stepwise directly from raw materials, from phosphoric acid of fertilizer quality, a base and organic additives. In accordance with the method, the phosphoric acid is preneutralised with the base, the organic additives are added, nucleation is controlled and phosphate salts are cooling crystallised in order to form a suspension. The phosphate suspension prepared with the method of the invention is applicable to seed coating.

13 Claims, No Drawings

METHOD FOR PREPARING A SUSPENSION CONTAINING PHOSPHATE

The invention relates to a method for preparing a phosphate suspension from phosphoric acid, a base and organic additives, the phosphoric acid being preneutralised with a lye mixture, the organic additives being added, the nucleation being controlled and cooling crystallisation being performed.

Root formation is an important stage of the initial development of a plant. A well-developed root system will subsequently be capable of efficiently utilising nutrients bound in earth particles. In order to develop, the roots need phosphor in particular, and the closer to the seed the phosphor is located, the better it is utilised by the germinating plant.

The applicant has developed the iSeed® solution for this demand, i.e. a seed coated with plant nutrients. WO Patent Application 0145489 discloses a seed coating formed of two components, the first component comprising an aqueous fixing agent including a liquid agricultural or fermentation by-product, especially molasses and emulsified oil, the second component comprising a fertilizer powder.

Although growth results under field conditions are good, phosphor exploitation has been enhanced and the overall demand for phosphor fertilization has decreased, a number of problems have still been stated in the practice.

In a method comprising initial addition of a fixing agent and subsequent addition of a fertilizer to the seed, the ratio of fixing agent to fertilizer may vary somewhat from one seed to another. This tends to result in fertilizer dust coming off during the treatment of coated seeds. This, again, affects the dosability of the seeds in the sowing machine. A loose fertilizer portion on the soil may either get too far from the seed or cause overdosage of the fertilizer at an individual seed. Dust produced during seed treatment is also considered an occupational hygiene problem.

The applicant's previous Patent Applications EP 0755369 and EP 0833806 disclose a suspension fertilizer suitable for irrigation fertilization, in which the fertilizer particles have a particle size less than 50 μm. However, these compositions are not suitable for use in seed coating due to their general composition.

The applicant's later Patent Application WO 0300030 describes a coated seed and a seed coating method, in which the fertilizer is also ground to a very fine size (<50 μm) before being fixed to the seed surface by means of a fixing agent.

Grinding as such is a supplementary, arduous and costly work step. Grinding to a sufficiently fine size (about 50 μm or less) is difficult, and it is not even possible to grind all nutrient salts to such a fine size, due to their hygroscopicity or the crystal water they contain, for instance. In addition, a very finely divided powder tends to agglomerate during storage. Unfavourable conditions may also lead to dust nuisance.

The iSeed coatings described above have used a separate fixing component and a nutrient powder component. By contrast, the present invention relates to a method, in which the fixing agent and nutrient powder components are combined before the seed is coated. This ensures a ratio of fixing agent to nutrients that remains constant during the coating and simplifies the seed coating process.

In the method of the present invention, phosphor is crystallised directly during the preparation of the phosphate suspension in the form of phosphate crystals of the desired size. This allows for the use of phosphoric acid and a base as the raw materials instead of different nutrient salts.

The phosphor concentration of this suspension can be adjusted to a phosphor concentration higher than that of previously used seed coatings, and its stability on the seed surface is good. The increased pH (pH 5.7) of the suspension compared to that of e.g. a previously used coating comprising monopotassium phosphate (MKP) (pH 4-4.5) reduces stress caused by acidity. This ensures germination even of sensible seeds.

The preparation of the phosphate suspension typically comprises four steps: phosphoric acid is preneutralised with a base at a temperature of 40-65° C. to a pH value of 3-3.5; organic additives are added; nucleation is controlled by neutralising the pre-neutralised mixture containing organic additives at a temperature of 40-60° C. to pH 5.3-6; a portion of the phosphor is cooling crystallised to acicular crystals in order to provide a phosphate suspension having the desired crystal size.

In one embodiment of the present invention the preneutralization to pH 3.1 is performed as a continuous process with a retention time of 0.5-2 hours.

The crystals of the phosphate suspension thus obtained have a width <30 μm and a ratio width/length <0.4. The viscosity of the suspension is 300-2000 cP (20° C.).

Depending on the purpose of use, e.g. colouring agents, trace elements or other agents for promoting seed germination and the initial growth of plants can be added to the phosphate suspension.

A NaOH/KOH mixture solution is preferably used as the base. In batch crystallisation, the molar ratio KOH/NaOH is preferably 1:1, yielding the advantage of higher solubility (eutectic point). In continuously operating crystallisation, the best results are obtained with a ratio KOH/NaOH of approx. 0.5. Adjustment of the molar ratio allows control of the viscosity, the adhesion and the P i.e. phosphor concentration of the finished phosphate suspension.

If the proportion of easily water-soluble NaOH is too high, this results in a sticky phosphate suspension, resulting in turn in coated seeds with sticky surfaces. A high KOH proportion increases the viscosity, requiring a larger amount of water to ensure the fluidity of the paste.

The phosphoric acid may consist of phosphoric acid of fertilizer quality, whose high phosphor concentration (54-62% of $P_2O_5$) is an advantage when aiming at a phosphate suspension with a high salt concentration. It is advantageous to use purified phosphoric acid having low fluorine and sulphate concentrations (<0.2% of F; and <1% of sulphate).

Metal impurities in phosphoric acid do not cause any harm. Trivalent ions, such as $Fe(3+)$, are even beneficial in order to achieve the correct crystal growth and crystal form. A concentrated phosphoric acid typically comprises about 0.4-0.5% of iron. If the iron concentration of phosphoric acid is increased (+0.15% of Fe), the nucleation of the finished suspension and the crystal growth can be controlled during storage of the suspension under cold conditions (+4° C.).

An iron addition also improves the preservability of the prepared phosphate suspension during storage; no modifications of the suspension were stated after one month of storage.

The phosphate suspension of the invention can be prepared both in a batch process and in a continuous process.

In a first step, phosphoric acid is pre-neutralised at a temperature in the range 40-65° C. to pH 3-3.5, most preferably at about 50° C. to pH 3.1. When the temperature rises (e.g. above 60° C.) water evaporation increases notably. The amount of water present has a great impact on the crystallisation occurring in the final step. The concentrations are always indicated in percent per weight and the pH values have been determined on a 1:10 dilution, unless otherwise indicated.

In the pre-neutralising step, too low a temperature (e.g. 20° C.) or too high a pH (e.g. pH 4) precipitate phosphate salts from the solution. Preneutralisation requires good mixing and cooling. One should try to avoid too cold cooling surfaces (e.g. <10° C.), in order to avoid the formation of deposits impeding heat transfer. In the practice, preneutralisation is easiest to carry out in a continuous process, the amounts of raw material to be added being small relative to the total amount of substance. This is also recommendable in terms of occupational safety aspects.

In a second step, organic additives, i.e. emulsifying and fixing agents (oil, emulsifier, sugar) are added for the preparation of the feed. These agents can be added at a relatively rapid rate (5-30 min) during the filling of the crystallisation reactors, or in a separate small reactor. They are readily admixed with preneutralised phosphoric acid. The initial crystallisation temperature drops by some degrees if they are added at room temperature.

In one embodiment of the present invention the emulsifiable oil and the sugar are added to the preneutralized phosphoric acid during stirring for 5-30 minutes at a temperature in the range 30-60° C.

The amount of organic additives to be added is affected by the stability required for the finished suspension, the emulsifiability of the oil and the regulation of viscosity by means of sugar, and also by seed coating factors, such as adhesion by means of sugar, fluidity and drying under the effect of oil. Sugar, oil or emulsifier in too large amounts cause problems in the stability of the suspension or in seed coating. The sugar used in this conjunction is preferably a 67% aqueous solution of saccharose and the oil is emulsifiable white oil.

In one embodiment of the present invention, 1.5-8% of emulsifiable oil and 1.5-10% of sugar is added as organic additives, calculated on the total amount of phosphate suspension.

In another embodiment of the present invention an emulsifiable white oil is used as the oil and saccharose is used as the sugar, the weight ratio oil/sugar being 0.3-1.

In the following step, the feed is neutralised from pH 3-3.5 to pH 5.3-6, preferably to pH 5.65 at a temperature in the range 40-60° C., preferably about 50° C. With pH in the range 4.5-5.3, monopotassium phosphate (MKP) is nucleated, its amount being controlled by means of the temperature and the pH. Good nucleation requires simultaneous control of the pH, the concentration and the temperature. Nucleation and crystal growth are also adjusted by means of additives and their concentrations (sugar, oil, metals of phosphoric acid). At this stage, too concentrated a solution may cause problems of viscosity, heat transfer and mixing.

In the last step, the desired portion of phosphor is crystallised in the form of monopotassium phosphate (MKP) by cooling the nucleated feed from 50° C. to about 15-20° C. during 0.75-3 hours. The final point equals the room temperature or is slightly below this (5-20° C.), for oversaturation to be completely eliminated. Cooling at a sufficiently rapid rate results in the formation of small acicular crystals. Crystallisation is particularly advantageously performed batchwise with rapid initial cooling from 40-60° C. to 30° C. in 0.25-1 hours and with slow final cooling from 30° C. to 15-20° C. in 0.5-2 hours. This cooling profile allows for exact control of the balance between nucleation and crystal growth and elimination of oversaturation of the solution.

In one embodiment the phosphate suspension prepared by the described method contains 10-14% of phosphor (P) and having a pH in the range 5.3-6, and a viscosity in the range 300-2,000 cP at a temperature of 20° C.

In another embodiment the phosphate suspension prepared in accordance with the described method contains 5-30% of acicular monopotassium phosphate crystals, the needles having a width <30 μm and a ratio width/length <0.4.

In one embodiment of the present invention the suspension is formed by cooling crystallizing the nucleated solution to a temperature in the range 5-25° C. with a retention time of 0.5-3 hours.

The end product is a homogenous phosphate suspension, in which about 10-20% of acicular MKP crystals are suspended, the crystals having a width <30 μm, preferably <25 μm and a ratio width/length is <0.4, preferably <0.25. The viscosity of the suspension varies with the temperature (5-30° C.) in the range 300-2000 cP. The typical value at room temperature is about 500-1000 cP. The pH of the end product is somewhat lower (e.g. pH 5.5-5.6) than in a measurement immediately after neutralisation (e.g. pH 5.6-5.7).

With the molar ratio KOH/NaOH being 1, the phosphate suspension contains preferably about 10% or organic substances (6% of saccharose, 4% of emulsified oil) and about 60% of phosphate salts, with crystal waters included. Of these salts, Na phosphate is completely dissolved at 20° C. and about 6-8% of K phosphate is dissolved. A phosphate suspension having a total phosphor concentration (P) in the range 10-14% contains about 10-25% of acicular monopotassium phosphate. When the molar ratio KOH/NaOH varies in the range 0.5-1.2, the amount of monopotassium phosphate varies accordingly in the range 5-30%.

Besides organic additives (sugar, oil, emulsifier) also the particle size of the solid substances affects the stability of the finished product. When the difference of density between the crystals and the solution is great and the viscosity of the liquid is low, large crystals settle. In the phosphate suspension in accordance with the invention. Acicular crystals easily break during seed coating or else when the suspension is violently stirred. Long needles can no longer be seen in microscopic images of coated seeds.

The preparation method of the invention is described below by means of examples, however, without limiting the invention to the examples given.

EXAMPLE 1

A phosphate suspension was prepared in a batch process on pilot scale using a base solution whose molar ratio KOH/NaOH was 1 for preneutralisation of the phosphoric acid.

The base solution contained 21.7% of K and 12.6% of Na. In this and the subsequent examples, the phosphoric acid was Siilinjärvi defluorinated and desulphatised phosphoric acid having a phosphor concentration of 57.7% calculated as $P_2O_5$.

A test series was conducted in order to examine the effect of the test conditions, mainly of the pH, the retention time and the temperature, on the properties of the finished phosphate suspension. Each preparation process was performed as described in the description, and the details of the test conditions and the results obtained appear in table 1.

TABLE 1

Conditions and results of pilot preparation of a phosphate suspension

| | Crystallisation test no | | | | | | |
|---|---|---|---|---|---|---|---|
| | 1 | 2 | 3 | 4 | 5 | 6 | 7 |
| PRENEUTRALISATION | | | | | | | |
| Preneutralisation, pH | 3.1 | 3.2 | 3.1 | 3.5 | 3.3 | 3.1 | 3.1 |
| Preneutralisation retention, h | 1 | 1.9 | 1.9 | 1 | 0.85 | 1 | 1 |
| Preneutralisation, ° C. | 52 | 64 | 62 | 50 | 52 | 51 | 50 |
| Buffer tank, ° C. | 45 | 53 | 53 | 47 | 48 | 47 | 44 |
| ADDITION AND NEUTRALISATION OF ORGANIC ADDITIVES/NUCLEATION | | | | | | | |
| After additive addition, ° C. | — | — | 38 | 35 | — | 30 | 35 |
| After neutralisation, ° C. | 40 | 49 | 47 | 52 | 54 | 46 | 50 |
| Neutralisation time, min | 19 | 16 | 16 | 32 | 17 | 14 | 17 |
| Final pH of neutralisation | 5.71 | 5.77 | 5.66 | 5.72 | 5.65 | 5.67 | 5.67 |
| CRYSTALLISATION | | | | | | | |
| Batch size, kg | 126 | 140 | 141 | 157 | 155 | 132 | 143 |
| Initial crystallisation time (-->30° C.), h | 0.4 | 1.5 | 0.4 | 0.8 | 1.9 | 0.5 | 0.7 |
| Final crystallisation time, h | 0.8 | 1.7 | 0.7 | 0.7 | 1.4 | 0.9 | 1.2 |
| Overall crystallisation time, h | 1.2 | 3.2 | 1.1 | 1.5 | 3.3 | 1.4 | 1.9 |
| Final crystallisation temperature ° C. | 15 | 20 | 20 | 20 | 16 | 15 | 15 |
| ANALYSES OF END PRODUCTS | | | | | | | |
| P % of end product | 11.9 | 12.8 | 12.9 | 12.3 | 12.7 | 12.5 | 12.6 |
| K % of end product | 7.8 | 8.3 | 8.3 | 8.0 | 8.1 | 8.1 | 8.3 |
| pH of end product | 5.6 | 5.5 | 5.5 | 5.6 | 5.5 | 5.5 | 5.5 |
| Viscosity of end product, cP | 330 | 930 | 750 | 820 | 600 | 550 | 450 |
| MKP crystal width, μm | <20 | <15 | <5 | <10 | <10 | <30 | <20 |
| Width/length of MKP crystals | <0.25 | <0.25 | <0.25 | 0.25 | <0.25 | <0.25 | <0.25 |
| Settling of end product/1 d, % | 0.7 | 0 | 0 | 0 | 0.2 | 1 | 0.3 |
| PRODUCT TEST WITH BARLEY | | | | | | | |
| Detachment from the seed surface, % (out of 100%) | — | 0 | — | — | — | 1.5 | — |

EXAMPLE 2

Using raw materials similar to those of the preceding example and continuous preneutralisation, a solution was prepared in a 4 liter reactor (Re1) and with additive addition in a 0.5 liter reactor (Re2), and the solution was neutralised and crystallised in an approx. 10 liter crystalliser tank (Re3). The feeds to reactor 1 were 5.34 kg/h of phosphoric acid and 3.27 kg/h of lye solution, and the feeds to reactor 2 were 0.92 kg/h of 67% saccharose solution and 0.40 kg/h of emulsified oil.

Feed was collected for 1.84 hours (18.3 kg) for crystallisation. In the second neutralisation step, 1.39 kg of lye solution was added during 20 minutes, while cooling, so that the pH rose from 3.1 to 5.65 and the temperature from 44° C. to 48° C. The suspension was crystallised in 47 minutes to the final temperature 15° C., the viscosity being 600 cP. After one day, the suspension had settled by 0.3%. The end product contained 12.5% of P, 8.0% of K, 4.8% of Na and it had a pH of 5.5.

EXAMPLE 3

A phosphate suspension was continuously prepared using a lye solution, whose molar ratio KOH/NaOH was 0.5. It was prepared by dissolving 2.31 kg of KOH, 3.31 kg of NaOH in 5 kg of water. This was done using a 4 liter preneutralisation reactor (Re1) with overflow to a 0.5 liter additive reactor (Re2) and further overflow to a 2 liter crystallisation reactor (Re3).

The feeds comprised 3.33 kg/h of phosphoric acid and 2.08 kg/h of base solution in reactor Re1, 0.56 kg/h of a 67% sugar solution and 0.23 kg/h of emulsified oil in reactor Re2, and also 0.54 kg/h of base solution in reactor Re3.

The temperature was maintained in the range 24-25° C. in reactors Re1 and Re2 and at 20-21° C. in reactor Re3. The retention times in the reactors were approx. 1 hour in reactor Re1, approx. 10 minutes in reactor Re2 and approx. 0.5 hours in reactor Re3. The pH was 3.7-4 in reactor Re1 and 5.7 in reactor Re3.

When measured one day after its preparation, the viscosity of the phosphate solution was 700-1,000 cP. The product did not separate in a stability test. The seed coating result was only passable, because the seed surface remained sticky.

EXAMPLE 4

To ensure the molar ratio of the base mixture, two test series were made. In 200 g batch crystallisation on a laboratory scale, it was observed that the ratio KOH/NaOH affects the viscosity, adhesion and P concentration of the phosphate suspension. The properties were determined after cold storage (5° C.) of one week, with initial stirring. Based on these preliminary tests (pH 5.7) the molar ratio KOH/NaOH=1 was stated to be the most advantageous. The results are given in table 2.

TABLE 2

Effect of the ratio KOH/NaOH on crystallisation and viscosity during cold storage

| Molar ratio KOH/NaOH | Crystallisation during cold storage | Viscosity (5° C.), cP |
|---|---|---|
| 0.5 | yes | — |
| 0.7 | yes | — |
| 1.0 | no | 200 |
| 1.1 | no | 2,000 |
| (totally KOH) | Yes | 11,500 |

However, in continuous crystallisation, the molar ratio KOH/NaOH=1 was not applicable because of excessive nucleation. Continuous crystallisation was applicable with a lower molar ratio, yet the products are not suitable for seed coating, because the crystals grew too much. Batch crystallisation with the molar ratio KOH/NaOH 0.8-1.0 proved the optimal preparation of the suspension. Besides the crystallisation manner, the viscosity was also affected by the pH. The suspension solidified gradually as the pH dropped and became thinner when the pH rose. These results are indicated in table 3.

TABLE 3

Effect of the molar ratio KOH/NaOH and the crystallisation manner

| Crystallisation manner | KOH/NaOH molar ratio | pH | Settling of the suspension 2 days, % | Viscosity of the product cP (20° C.) | Seed coating result |
|---|---|---|---|---|---|
| Continuous | 0.50 | 5.70 | 0.7 | 880 | Passable |
| Continuous | 0.50 | 5.72 | 0.7 | 760 | Passable |
| Batch | 0.50 | 5.48 | 0 | 1200 | Passable |
| Batch | 0.50 | 5.40 | 0 | 1800 | Passable |
| Continuous | 0.67 | 5.72 | 2.7 | 1100 | Satisfactory |
| Continuous | 0.67 | 5.74 | 3.7 | 360 | Satisfactory |
| Batch | 0.8 | 5.53 | 0.2 | 1100 | Excellent |
| Batch | 0.8 | 5.58 | 0.3 | 1500 | Excellent |
| Batch | 0.9 | 5.64 | 0.3 | 1150 | Excellent |
| Batch | 0.9 | 5.55 | 0 | 1330 | Excellent |
| Batch | 1.0 | 5.60 | 0.3 | 2100 | Excellent |
| Batch | 1.0 | 5.70 | 0.7 | 1500 | Excellent |

EXAMPLE 5

The effect of the pH on the properties of the phosphate suspension were examined with 200 g batch crystallisations using a base, whose molar ratio KOH/NaOH was 1. It was found that at pH 3.45 and pH 5.71, physically equivalent products were obtained. In this test series, the suspensions were too viscous in the range pH 4-pH 5.5. During seed coating, the more acidic suspension was stickier and dried more slowly. In addition, it impaired the germination of susceptible seeds, such as wheat seeds. A neutral suspension (pH 5.71) dried well and maintained good seed germination. The test results are assembled in table 4.

TABLE 4

Effect of the pH on the properties of a phosphate suspension

| | OH/P, mol/mol | | | | | | | |
|---|---|---|---|---|---|---|---|---|
| | 0.91 | 0.95 | 1 | 1.05 | 1.1 | 1.15 | 1.20 | 1.25 |
| pH of the suspension (10%) | 3.45 | 3.93 | 4.67 | 5.21 | 5.5 | 5.71 | 5.86 | 6.01 |
| viscosity (2 days, 5° C.), cP | <1,000 | <10,000 | >10,000 | >10,000 | <10,000 | <1,000 | <500 | <500 |
| suspension stability (2 days) settling % | 1 | 0 | 0 | 0 | 0 | 1 | 10 | 5 |
| Drying of the seed coating | Sticky | | | | | Dry | | |
| Barley germination | Maintained | — | — | — | — | Maintained | — | — |
| Wheat germination | Decreased | — | — | — | — | Maintained | — | — |

EXAMPLE 6

The appropriate amount of additives was optimised by various trials. A conventional two-component coating (coating+MKP powder in a weight ratio of 1:1) produces about 6.25% of oil and 11% of saccharose calculated on the overall addition amount. The best result in the new phosphate suspension is obtained with about half of this amount.

In a test for coating rapeseed with an otherwise typical recipe (pH 5.65, molar ratio KOH/NaOH=1, about 12.5% of P), but with different additive compositions, it was stated that too low a ratio of oil to saccharose causes storage problems (Test C). Flow through a funnel is also impaired by sugar addition. The results are given in table 5.

TABLE 5

Effect of an organic additive composition on coated seeds.

|  | Test A | Test B | Test C | Test D |
|---|---|---|---|---|
| Emulsified oil, % | 3.87 | 7.74 | 3.87 | 7.74 |
| Saccharose, % | 5.9 | 5.9 | 11.8 | 11.8 |
| Oil/sugar (w/w) | 0.66 | 1.31 | 0.33 | 0.66 |
| Knocking needed to initiate flow measured in a funnel immediately after seed coating | No | No | Yes | Yes |
| Flow time in a funnel immediately after seed coating, s/400 g | 46 | 47 | 59 | 56 |
| 1 week of storage in a closed bag, % of settings | 0 | 3 | 50 | 15 |
| 1 week in a closed bag, flow time in a funnel after settings have been broken, s/400 g | 33 | 34 | 35 | 36 |

The second test series examined the effect of the additives in a typical phosphate suspension (with the molar ratio KOH/NaOH=1 pH 5.7) on the stability and the coating result. Both the amount of additives and their ratio affects separation and stickiness in seed coating. It can be seen that even a small amount of oil (1.5%) decreases stickiness. Table 6 shows the results.

TABLE 6

Effect of additives on the stability of the suspension and the quality of coated seeds.

| P, % | Emulsified oil % | Sugar % | Oil/ sugar | Suspension stability | Seed coating, physical quality |
|---|---|---|---|---|---|
| 11.5 | 3.15 | 5.53 | 0.57 | No separation | Not sticky |
| 13.2 | 1.72 | 3.5 | 0.49 | Water and oil separated in a very small amount | Somewhat sticky |
| 12.2 | 1.52 | 9.26 | 0.16 | Water and oil separated in a small amount | Somewhat sticky |
| 11.9 | 0 | 5.71 | 0 | No separation | Very sticky |

The invention claimed is:

1. A method for preparing a phosphate suspension wherein the phosphoric acid which is of fertilizer quality having 54-62% of $P_2O_5$ containing <0.2% of fluorine and <0.1% of sulphate is preneutralized with a base, emulsifiable oil and sugar are added as organic additives, nucleation is controlled by adjusting the pH to 5.5-5.8 with a retention time in the range of 10-30 minutes at a temperature in the range of 40-60° C. using a base, and phosphate salts are cooling crystallized to form a suspension which is suitable for seed coating.

2. A method as defined in claim 1, in which a mixture of potassium hydroxide and sodium hydroxide is added as the base in a molar ratio of KOH/NaOH=0.5-1.2.

3. A method as defined in claim 1, in which phosphoric acid of fertilizer quality having 54-62% of $P_2O_5$ used as the phosphoric acid.

4. A method as defined in claim 1, in which, calculated on the total amounts of phosphate suspension, 1.5-8% of emulsifiable oil and 1.5-10% of sugar are added as organic additives.

5. A method as defined in claim 1, in which preneutralization of phosphoric acid to pH 3-3.5 is conducted at a temperature in the range of 40-65° C.

6. A method as defined in claim 1, in which the emulsifiable oil and the sugar are added to the preneutralized phosphoric acid during stirring for 5-30 minutes at a temperature in the range of 30-60° C.

7. A method as defined in claim 1, in which the suspension is formed by cooling crystallizing the nucleated solution to a temperature in the range of 5-25° C. with a retention time of 0.5-3 hours.

8. A phosphate suspension suitable for use in seed coating obtained by the method of claim 1, containing 10-14% of phosphor (P) in the form of acicular monopotassium phosphate crystals and having a pH in the range of 5.3-6, and a viscosity in the range of 300-2,000 cP at a temperature of 20° C.

9. A phosphate suspension of claim 8, containing 5-30% of acicular monopotassium phosphate crystals, the needles having a width <30 μm and a ratio width/length <0.4.

10. A method as defined in claim 4, using an emulsifiable white oil as the oil and saccharose as the sugar, the weight ratio of oil/sugar being 0.3-1.

11. A method as defined in claim 5, in which preneutralization to pH 3.1 is performed as a continuous process with a retention time of 0.5-2 hours.

12. A method as defined in claim 7, in which the phosphate suspension is produced by cooling crystallization of the nucleated solution from a temperature in the range of 40-60° C. to a temperature in the range of 15-20° C. with a retention time of 0.75-3 hours.

13. A method as defined in claim 12, in which the crystallization is performed batchwise with rapid initial cooling from a temperature in the range of 40-60° C. to 30° C. in 0.25-1 hours and with slow final cooling from 30° C. to 15-20° C. in 0.5-2 hours.

* * * * *